United States Patent [19]

Tate

[11] 3,791,446

[45] Feb. 12, 1974

[54] METHOD FOR STIMULATING WELL PRODUCTION

[75] Inventor: Jack F. Tate, Houston, Tex.

[73] Assignee: Texaco Inc., New York, N.Y.

[22] Filed: June 25, 1971

[21] Appl. No.: 157,051

Related U.S. Application Data

[63] Continuation-in-part of Ser. No. 82,182, Oct. 19, 1970, abandoned.

[52] U.S. Cl. ............................ 166/307, 252/8.55 C
[51] Int. Cl. ............................................. E21b 43/27
[58] Field of Search ........... 166/307, 281, 283, 282; 252/8.55 C; 260/88.3 L

[56] References Cited
UNITED STATES PATENTS

| | | | |
|---|---|---|---|
| 3,179,171 | 4/1965 | Beale, Jr. ........................ | 252/8.55 C |
| 2,763,326 | 9/1956 | Cardwell et al. ............ | 252/8.55 C X |
| 3,252,904 | 5/1966 | Carpenter ........................... | 166/283 |
| 3,434,971 | 3/1969 | Atkins ............................ | 166/307 X |
| 3,254,719 | 6/1966 | Root ................................ | 166/308 |
| 3,294,729 | 12/1966 | Hort et al. ...................... | 260/88.3 L |
| 3,294,765 | 12/1966 | Hort et al. ...................... | 166/307 UX |

*Primary Examiner*—Stephen J. Novosad
*Attorney, Agent, or Firm*—Thomas H. Whaley; Carl G. Ries

[57] ABSTRACT

The production of hydrocarbons from a subterranean hydrocarbon-bearing formation containing acid-soluble components, such as one composed at least in part of dolomite or limestone, is stimulated by injecting into the formation a composition comprising an aqueous solution of a mineral acid having dissolved therein a vinylpyrrolidone polymer. The increase in the permeability and porosity of the formation achieved utilizing the method of invention results in a substantial improvement in hydrocarbon recovery.

6 Claims, No Drawings

METHOD FOR STIMULATING WELL PRODUCTION

CROSS REFERENCE TO COPENDING APPLICATION

This application is a continuation-in-part of commonly assigned application Ser. No. 82,182 filed Oct. 19, 1970 now abandoned.

FIELD OF THE INVENTION

This invention relates to a method for stimulating the production of fluids from earthen formations. More particularly, this invention relates to a method in which the permeability and porosity of a hydrocarbon-bearing formation containing acid-soluble components and with or without water-sensitive clays or shales are improved on treatment of the formation with an aqueous solution of a vinylpyrrolidone polymer and a mineral acid.

DESCRIPTION OF THE PRIOR ART

The technique of increasing the permeability of a subterranean hydrocarbon-bearing formation for the purpose of stimulating the production of fluids therefrom has long been practiced in the art. One such method commonly employed is known as acidizing which is widely utilized in treating subsurface calcareous geological formations, e.g., limestone, dolomite, etc. In the usual well-acidizing procedure, a non-oxidizing mineral acid is introduced into the well and under sufficient pressure is forced into the adjacent subterranean formation where it reacts with acid-reactive components, particularly the carbonates such as calcium carbonate, magnesium carbonate, etc., to form the respective salt of the acid, carbon dioxide and water. The usual acid employed in such acidization procedures is hydrochloric acid.

During the process passageways for fluid flow are created or existing passageways therein are enlarged thus stimulating the production of oil, water, brines and various gases. If desired, the acidization may be carried out at an injection pressure sufficiently great to create fractures in the strata or formation which has the desired advantage of opening up passageways into the formation along which the acid can travel to more remote areas from the well bore. The salt formed is extensively water soluble and is readily removed by reverse flow from the formation via the well bore.

There are, however, disadvantages attending the use of hydrochloric acid or other similar non-oxidizing mineral acids. For example, these strong aqueous acids have almost instantaneous rates of reaction with the carbonates contained in the formation. The acid, therefore, necessarily spends itself in the formation immediately adjacent the well bore so little beneficial effect is realized at any great distance from the well bore within the formation under treatment. These strong aqueous acids also may cause channeling, cavitation and eventual collapse of the formation immediately adjacent the well bore due to excessively rapid action of the acid. In addition, subsurface equipment may be damaged severely by strong acid attack.

One suggested solution to overcome these disadvantages has been the use of "retarded" acids which consist of a mineral acid and an additive which emulsifies the acid the combination of which affects the acidization rate. However, although such emulsified mixtures can be displaced into a formation before substantial reaction occurs, they have the inherent disadvantage that when the emulsion breaks and they do react, they usually react swiftly, often unpredictably, and without substantially resolving the problem of cavitation.

A later development in acidizing wells has been the use of potentially acidic materials which are capable of producing a strong aqueous acid by means of a chemical reaction at a more or less constant rate over a period of time and which subsequently reacts with the formation to enhance porosity and permeability. However, with aqueous systems containing these potentially acidic material, the effectiveness of the acidizing operation too often is negated in subterranean hydrocarbon-bearing formations which contain water-sensitive clays or shales. These water-sensitive shales react or interact with the aqueous medium to swell, which results in decreasing formation permeability, thereby largely offsetting any improvement in permeability which might have been realized by the action of the potentially acidic material. In fact, it has been found that the net effect of the swelling of water-sensitive clays often may result in an overall decrease in formation permeability following the acidization.

The use of cross-linked copolymers of polyvinylpyrrolidone and polyacrylamides, polyurethanes, etc. to give materials which are insoluble in aqueous mineral acid solutions is described in U.S. Pat. No. 3,380,529 to Hendrickson. Such insoluble, cross-linked polymers are utilized as agents for partially plugging channels developed during acidization treatment in order to effect acidic attack at greater distances from the well bore. In U.S. Pat. No. 3,434,971 a similar acidization process is described in which a copolymer prepared by polymerizing acrylamide and N-vinylpyrrolidone in the presence of a cross-linking agent, such as N,N'-methylenebisacrylamide, is disclosed. These copolymers are insoluble in the aqueous mineral acid solutions employed in acidization operations and are utilized as dispersions in the acid solutions. Both of the previously mentioned acidization processes which utilize insoluble, cross-linked copolymers are distinctly different from the novel method of this invention in which a vinylpyrrolidone polymer soluble in aqueous mineral acid solutions is used.

It is therefore, the principal object of the present invention to overcome the defects of the prior art in acidizing fluid bearing formations such as hydrocarbon-bearing formations, etc., by providing a method utilizing the novel acidizing composition of this invention in which the distance to which the acidizing composition penetrates the formation before becoming spent is extended, thus providing in-depth acidization.

Another object of this invention is to provide a method of acidization employing the novel composition of this invention which is effective in preventing the swelling of water-sensitive clays and shales.

Another object of this invention is to provide a high viscosity acidizing fluid containing in solution a vinylpyrrolidone polymer which is stable over long periods of time in which the polymer constituent does not hydrolyze or otherwise decompose on storage thus avoiding the simultaneous reduction in viscosity and effectiveness in acidization-in-depth operations.

SUMMARY OF THE INVENTION

This invention encompasses and includes a method of increasing the production of fluids from a subterranean fluid-bearing formation having present acid-soluble components and with or without water-sensitive clays or shales, comprising injecting down the well bore penetrating said formation and injecting therefrom into said formation under a pressure greater than formation pressure an aqueous acidizing composition, maintaining said composition in contact with the formation strata for a time sufficient for the acid to chemically react with the acid-soluble components of the formation to etch or enlarge passageways therethrough thereby increasing substantially the flow capacity of the said subterranean formation.

The novel acidizing composition of this invention comprises an aqueous solution of a non-oxidizing mineral acid, such as hydrochloric, sulfuric, etc., having dissolved therein a vinylpyrrolidone polymer. The amount of acid present in the subject composition is such that it is capable of reacting with acid soluble components of the fluid-bearing strata.

A number of advantages result in employing the novel composition of this invention in acidizing calcareous fluid-bearing formations, namely:

1. The reaction rate of the acid with the formation acid-solubles, such as carbonates, dolomites, etc., is greatly lessened. One of the most serious problems encountered in the use of mineral acids as acidizing agents is the very rapid rate with which the known acidizing compositions react with such acid-solubles so that little actual effect takes place at any great distance from the well.

2. The post-precipitation of dissolved carbonates is prevented. Because of the nature of the dissolution reaction:

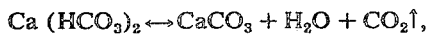

when pressure is released so that spent reaction products from the acidization process can flow back out or be pumped out, carbon dioxide gas can break out of solution, causing post-precipitation of calcium carbonate. Such post-precipitation occurring within the formation matrix near the bore hole can decrease permeability by plugging capillaries and result in a lower production rate.

3. The viscosity of the acidizing fluid is increased. Such a viscosity increase is characteristic of fluid-loss agents often used in acidizing formulations to cause more uniform formation penetration and minimize leakage into zones of higher permeability or into natural fractures.

4. The cited polymer is highly effective in preventing swelling of water-sensitive clays or shales and thus formation damage of this type during acidization is largely avoided.

DETAILED DESCRIPTION OF THE INVENTION

In its broadest embodiment the method of the present invention comprises introducing into a subsurface calcareous formation an acid solution of a water-soluble vinylpyrrolidone polymer wherein the said solution is maintained in contact with the formation for a time sufficient to chemically react with the formation so as to increase substantially the flow capabilities of the formation and to release carbon dioxide concomitantly whereby a beneficial effect due to the mutual miscibility of carbon dioxide in the fluid phases is realized as a reduction in viscosity and retentive capillary forces, while another beneficial effect is realized in the form of increased formation energy, due to the pressure generated by the released carbon dioxide.

The average molecular weight of the vinylpyrrolidone polymers utilized in the method of this invention generally will be from about 10,000 to about 1,000,000 or more and preferably will be from about 100,000 to about 400,000.

Highly advantageous results are realized with the method of this invention when water-soluble vinylpyrrolidone polymers having recurring units of the formula:

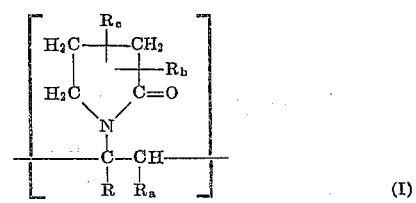

wherein $R$, $R_a$, $R_b$ and $R_c$ are independently selected from the group consisting of hydrogen and alkyl radicals having from 1 to 5 inclusive carbon atoms are employed. Useful alkyl radicals of 1 to 5 inclusive carbon atoms include methyl, ethyl, propyl, butyl, pentyl, and isomeric forms thereof. The sole limitation on the cited structure is that it be sufficiently soluble in the aqueous acid. When $R$, $R_a$, $R_b$ and $R_c$ of Formula I above are each hydrogen, the resulting compound is polyvinylpyrrolidone, i.e., poly-N-vinyl-2-pyrrolidone which is an especially useful polymer.

Preferably, the acidic polymer solution of this invention is one comprising an aqueous solution of about 3 to about 30 percent by weight of a non-oxidizing mineral acid, which may or may not include brine, and which contains dissolved therein between about 0.1 to about 10 percent by weight based on the total solution weight of the water-soluble vinylpyrrolidone polymer.

Generally, the acidic polymer solution will contain an inhibitor to prevent or greatly reduce the corrosive attack of the acid on metal. Any of a wide variety of compounds known in the art and employed for this purpose can be used, e.g., certain compounds of arsenic, nitrogen or sulfur as described by Grebe et al. in U.S. Pat. No. 1,877,504 or a rosin amine type as described in U.S. Pat. No. 2,758,970. The amount of the inhibitor utilized is not highly critical and it may be varied widely. Usually this amount is defined as a small but effective amount, e.g., from 0.02 percent to about 2.0 percent by weight or more of the acidic polymer solution.

The preparation of vinylpyrrolidone polymers suitable for use in the acidizing composition of this invention is described in Kirk-Othmer, *Encyclopedia of Chemical Technology*, Vol. 1, Second Edition, Interscience Publishers, N.Y., 1963, p. 205. Such vinylpyrrolidone monomers can be synthesized by reacting a carboxylic acid amide of the formula:

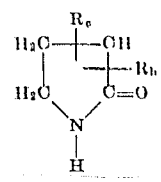

such as 2-pyrrolidone, 3-methyl-2-pyrrolidone, 4,4-diethyl-2-pyrrolidone, 5-isobutyl-2-pyrrolidone, 4-methyl-2-pyrrolidone, 3-ethyl-2-pyrrolidone, 3-methyl-5-ethyl-2-pyrrolidone, etc., with acetylene or an acetylenic derivative of the formula:

$$RC \equiv CR_a,$$

wherein R, and $R_a$, have the same meaning as previously described, under pressure at a temperature of about 130° to about 160°C. and in the presence of the alkali metal salts of these acetylenic compounds as catalysts. Polymerization of the resulting monomers can be conducted by methods well known in the art.

In carrying out the method of this invention a solution of from about 3 to about 30 percent by weight of the non-oxidizing mineral acid dissolved in water is first prepared. An inhibitor to prevent corrosion of acid on the metal equipment associated with the well is usually added with mixing in the next step. The vinylpyrrolidone polymer in an amount within the stated concentration range is then admixed with the aqueous acid solution employing a blender. The polymer dissolves rather rapidly in the acid solution and the thus-prepared composition is forced, usually via a suitable pumping system, down the well bore and into contact with the formation to be treated. As those skilled in the art will readily understand, the pressure employed is determined by the nature of the formation, viscosity of the fluid, and other operating variables. The acidization method of this invention may be carried out at a pressure sufficient merely to penetrate the formation or it may be of sufficient magnitude to overcome the weight of the overburden and create fractures in the formation. Propping agents, to prop open the fractures as created, for example 20 to 60 mesh sand, in accordance with known fracturing procedures, may be employed in admixture with the aqueous acidic solution. Generally, it is advisable to allow the aqueous acidic polymer solution to remain in contact with the formation until the acid therein has been substantially depleted by reaction with the acid-soluble components of the formation. After this, the substantially spent treating solution is reversed out of the well, i.e., it is allowed to flow back out or to be pumped out of the formation. Further, as those skilled in the art will understand, the concentration of the polymer and acid should be chosen to provide an acidizing fluid of the desired rheological properties. Similarly, the appropriate molecular weight polymer is selected on this same basis.

The following is a description by way of examples of three series of tests whereby the effectiveness of the present invention has been demonstrated.

In this first series of tests the reaction rate of a cylindrical Austin chalk core (2.2 cm in length, 2.2 cm. in diameter) with solutions of 1 percent and 0.5 percent by weight of polyvinyl-pyrrolidone of molecular weight 360,000, where $R, R_a, R_b$ and $R_c$, are hydrogen atoms and intrinsic viscosity of 1.61 dissolved in a 15 percent by weight aqueous hydrochloric acid solution was determined. The results are summarized in the Table 1 which follows:

TABLE 1

| Time (min.) | 15% HCl | 0.5% A* in 15%HCl | 1% A* in 15% HCl |
|---|---|---|---|
| | | ppm dissolved CaCO₃ | |
| 1 | 27,600 | — | 500 |
| 2 | 43,400 | — | 500 |
| 3.58 | 58,780 | — | 3850 |
| 5.84 | 73,300 | 13,200 | 6780 |
| 8.33 | 79,180 | 19,020 | 10,000 |
| 10.0 | 79,480 | — | — |
| 11.6 | 79,990 | 24,780 | 13,210 |
| 13.3 | 80,980 | — | — |
| 15.8 | 82,480 | 30,000 | 16,500 |
| 20.0 | 83,100 | — | — |
| 21.6 | — | 41,100 | 21,620 |
| 30.0 | — | 51,500 | 28,820 |
| 41.6 | — | 65,100 | 38,600 |
| 58.4 | — | 77,900 | 51,000 |
| 83.4 | — | 88,900 | 64,100 |
| 116.5 | — | — | 77,600 |

*Additive A — polyvinylpyrrolidone having an average molecular of 360,000, R and R' are hydrogen atoms; and instrinsic viscosity of 1.61.

From the data presented in the above table, it is evident that the polyvinylpyrrolidone, when dissolved in a mineral acid widely employed in acidizing procedures, is effective in greatly reducing the rate of attack by said acid on a limestone or chalk formation.

In a second series of tests the viscosity of solutions of 0.5 percent and 1 percent by weight of the same polyvinylpyrrolidone polymer employed in the first series of tests (i.e., Additive A) dissolved in 15 percent by weight aqueous hydrochloric acid over extended periods of time was measured. Many polymeric materials hydrolyze or otherwise decompose in mineral acids over relatively short periods of time with accompanying simultaneous reduction in viscosity and therefore effectiveness in well acidization operations.

Accordingly, the viscosity of the above-described polymer solutions in hydrochloric acid was measured over a period of 28 days. The results are set forth in Table 2.

TABLE 2

| Concentration of Additive A (% in 15% HCl) Composition | Days Elapsed | RELATIVE VISCOSITY | | |
|---|---|---|---|---|
| | | 0 | 0.5 | 1 |
| 15% HCl | | 1.00 | — | — |
| Solution of Additive A in HCl | 3 | — | 1.99 | 3.40 |
| Solution of Additive A in HCl | 14 | — | 1.93 | 3.32 |
| Solution of Additive A in HCl | 28 | — | 1.92 | 3.28 |

The results depicted in Table 2 indicate that little, if any, decomposition of the polymer occurs over a period of 28 days.

In this third series of tests an Ostwald viscometer was used to measure the viscosity (relative to 15% HCl) of various solution of the same vinylpyrrolidone polymer employed in the first series of tests (i.e., Additive A) in 15 percent by weight HCl at room temperature. The following table summarizes these results.

TABLE 3

| Concentration of additive (% in 15% HCl) COMPOSITION | RELATIVE VISCOSITY | | | |
|---|---|---|---|---|
| | 0 | 0.5 | 1 | 5 |
| 15% HCl | 1.00 | — | — | — |
| Solution of Additive A in HCl | — | 1.97 | 3.26 | — |
| Solution of Additive B in HCl | — | — | — | 2.52 |

Additive B-polyvinylpyrrolidone having an average molecular weight of 40,000, R and R' are hydrogen atoms and intrinsic viscosity of 0.225.

These data demonstrate that dissolution of the cited polymer in 15% HCl produces a remarkable increase in viscosity.

EXAMPLE I

A well drilled in Gregg County, Texas in a tight limestone formation was treated with an aqueous acidic polymer composition of this invention in order to stimulate oil production. In preparing to treat the producing formation of the well a packer was set at 7253 feet above perforations located in the interval 7285-95 feet. A solution of 1 percent by weight polyvinylpyrrolidone having a molecular weight of 360,000 and an intrinsic viscosity of 1.61 was prepared by dissolving completely 500 pounds of the polymer in 6000 gallons of 15 percent by weight hydrochloric acid using cyclic turbulent circulation. A conventional corrosion inhibitor and non-emulsifying agent were present in the acid.

In the first part of the stimulation operation, a pad of 2,100 gallons of lease water containing 20 gallons of a scale inhibitor initially to prevent post-precipitation of carbonates dissolved in the subsequent acidizing process was pumped into the formation. In the next step, 1000 gallons of conventional 15 percent HCl was pumped into the formation to remove scale in the vicinity of the well bore. In the third step, 4,000 gallons of the acidizing mixture previously described was pumped into the formation Finally, the aqueous acidic polymer solution was displaced into the formation by pumping an additional 16,000 gallons of lease water into it. The well was shut in nine days after treatment and at the end of that time the production was measured and found to be 5 bbl/day of oil with 140 bbl/day of water as compared to a production rate of 3 bbl/day of oil and 0 bbl/day of water prior to the acidization treatment. After 33 days had elapsed production was 14 bbl/day of oil and 130 bbl/day of water.

EXAMPLE II

In this example, a well drilled in Caddo Parish, Louisiana into a tight limestone formation was treated with a quantity of the same acidic aqueous polymer solution as utilized in Example I. In this well, open end tubing was set at 2220 ft. Perforations were in the intervals 2234-2240 ft. and 2262-2266 ft. which contains 72 shots. The procedure followed in stimulating production of the producing formation and this well was the same as that described in Example I except that no conventional 15% HCl was used initially, 1,000 gallons of the acidic aqueous polymer solution was employed in treating the formation and only 1500 gallons of lease water flush was achieved becaue of mechanical problems at the well head. A total of 75 balls were used as diverters in the retarded acid stage of this treatment operation, the purpose of the balls being to divert the acid to assure that it enters all perforations.

After treatment, the well was shut in for 2 days and at that time production was measured and found to be 34 bbl/day of oil and 107 bbl/day of water whereas, prior to the stimulation treatment of this example, the production was 5 bbl/day of oil and 32 bbl/day of water. After 114 days had elapsed, production was 18 bbl/day of oil and 89 bbl/day of water.

What is claimed is:

1. A method of increasing the production of fluids from a subterranean fluid bearing formation having present therein acid-soluble components and being without water-sensitive shales or clays comprising injecting down the well bore penetrating said formation and injecting therefrom into said formation under a pressure greater than the formation pressure an aqueous well acidizing composition comprising an aqueous solution of a mineral acid having dissolved therein a vinylpyrrolidone polymer, the said acid being present in an amount capable of reacting with the acid-soluble components of a subterranean fluid-bearing formation and wherein the said polymer comprises recurring units of the formula:

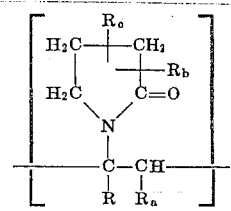

wherein $R$, $R_a$, $R_b$ and $R_c$ are independently selected from the group consisting of hydrogen and alkyl of from 1 to 5 inclusive carbon atoms maintaining said composition in contact with the formation for a time sufficient for the acid to chemically react with the acid-soluble components of the formation to etch passageways therethrough thereby increasing substantially the flow capacity of the said subterranean formation.

2. The method of claim 1, wherein the said formation is a hydrocarbon-bearing formation.

3. The method of claim 1, wherein the said composition is injected down the well bore penetrating said formation under a pressure greater than the formation pressure but less than the pressure required to create fractures in the formation.

4. A method of increasing the production of fluids from a subterranean fluid bearing formation having present therein acid-soluble components and being without water-sensitive shales or clays comprising injecting down the well bore penetrating said formation and injecting therefrom into said formation under a pressure greater than the formation pressure an aqueous well acidizing composition comprising an aqueous solution of a mineral acid having dissolved therein a vinylpyrrolidone polymer present in a concentration of from about 0.1 to about 10 percent by weight, the said acid being present in an amount capable of reacting with the acid-soluble components of a subterranean fluid-bearing formation and wherein the said polymer comprises recurring units of the formula:

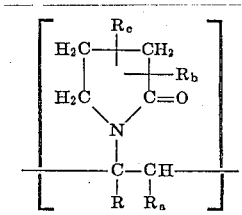

wherein $R$, $R_a$, $R_b$ and $R_c$ are independently selected from the group consisting of hydrogen and alkyl of from 1 to 5 inclusive carbon atoms, maintaining said composition in contact with the formation for a time sufficient for the acid to chemically react with the acid-soluble components of the formation to etch passageways therethrough thereby increasing substantially the flow capacity of the said subterranean formation.

5. A method of increasing the production of fluids from a subterranean calcareous fluid-bearing formation having present therein acid-soluble components and being without water-sensitive shales or clays comprising injecting down the well bore penetrating said formation and injecting therefrom into said formation under a pressure greater than the formation pressure an aqueous well acidizing composition comprising about 3 to about 30 percent by weight of hydrochloric acid having dissolved therein from about 0.1 to about 10 percent by weight based on the total weight of the composition of polyvinylpyrrolidone having an average molecular weight of about 100,000 to about 400,000, maintaining said composition in contact with the formation for a time sufficient for the acid to chemically react with the acid-soluble components of the formation to etch passageways therethrough thereby increasing substantially the flow capacity of the said subterranean formation.

6. A method of increasing the production of fluids from a subterranean limestone fluid-bearing formation having present therein acid-soluble components and being without water-sensitive shales or clays comprising injecting down the well bore penetrating said formation and injecting therefrom into said formation under a pressure greater than the formation pressure an aqueous well acidizing composition comprising about 3 to about 30 percent by weight of hydrochloric acid having dissolved therein from about 0.1 to about 10 percent by weight based on the total weight of the composition of polyvinylpyrrolidone having an average molecular weight of about 100,000 to about 400,000, maintaining said composition in contact with the formation for a time sufficient for the acid to chemically react with the acid-soluble components of the formation to etch passageways therethrough thereby increasing substantially the flow capacity of the said subterranean formation.

* * * * *